J. V. KAMMERS.
REAR AXLE.
APPLICATION FILED MAR. 4, 1920.

1,394,842.

Patented Oct. 25, 1921.

Inventor
John V. Kammers

By Herbert E. Smith
Attorney

UNITED STATES PATENT OFFICE.

JOHN V. KAMMERS, OF SPRAGUE, WASHINGTON.

REAR AXLE.

1,394,842. Specification of Letters Patent. Patented Oct. 25, 1921.

Application filed March 4, 1920. Serial No. 363,307.

*To all whom it may concern:*

Be it known that I, JOHN V. KAMMERS, a citizen of the United States, residing at Sprague, in the county of Lincoln and State of Washington, have invented certain new and useful Improvements in Rear Axles, of which the following is a specification.

The present invention relates to improvements in rear axles for automobiles, designed especially for use in connection with the Ford type of automobiles whereby the axle is strengthened and lightened and adequate and efficient means provided for lubricating the parts thereof and of the differential gearing, without waste, but with uniformity and equality in distribution. To this end the invention consists in specially constructing the axle shaft in tubular form and equipping it with a spirally arranged rib or flange in the form of an external bead, the whole being inclosed in the axle tube in usual manner and operating according to the well known style or type of axle shaft in the Ford make of cars and trucks.

In the accompanying drawings which form part of this specification I have illustrated one complete example of the physical embodiment of my invention, constructed and arranged according to the best mode I have so far devised for the practical application of the principles of my invention.

Figure 1:
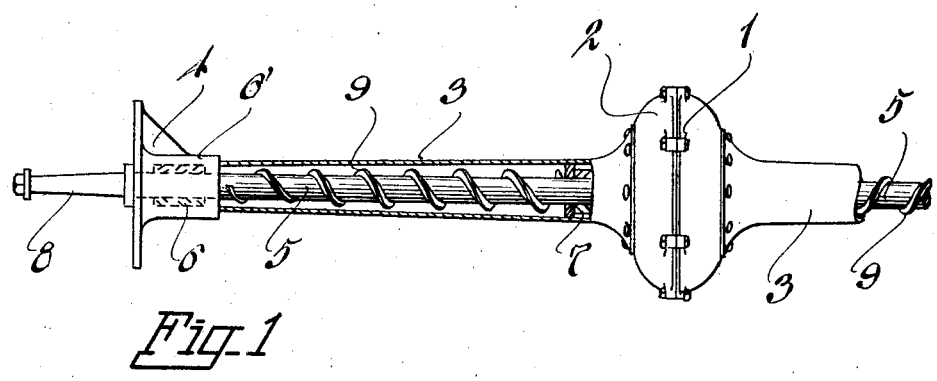
Figure 1 is a view showing a major portion of the rear axle and connections of a Ford car, part of the axle tube being broken away for convenience of illustration.
Figure 2:
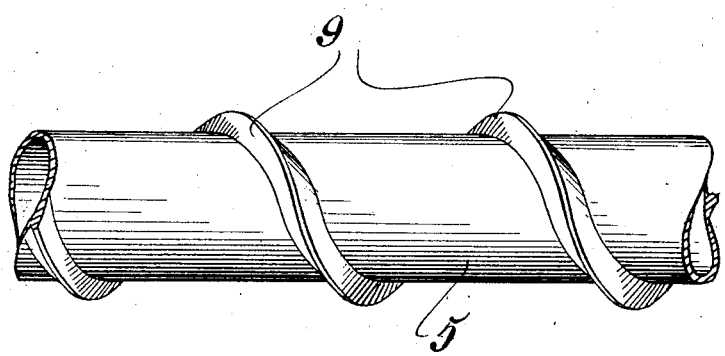
Fig. 2 is an enlarged, detail view showing a fragment of the axle shaft forming part of the invention.

In the preferred form of the invention as illustrated in the drawings I have shown in Fig. 1 the usual differential casing or axle housing designated as 1 at the right and 2 at the left center of the housing, the usual metallic axle tube 3 extending laterally from the center casing or housing, and at the left end of the tube in Fig. 1 the rear axle brake housing 4 is shown to support the axle shaft 5 by the usual roller bearings 6 shown in dotted lines in the interior of the bearing sleeve 6'.

The axle shaft 5 is provided with bearings as at 7 at the sides of the differential casing 1—2 and is provided with the usual, solid journal 8 at its extreme end, two of the journals of course being provided on the axle shaft.

In the preferred form the axle shaft is made or fashioned from a hollow tube of proper dimensions and tensile strength to adequately perform its functions, thus providing a light but strong axle for its purpose, and an additional strengthening and bracing element is formed for the tubular shaft by the spirally extending, external rib or bead 9, formed as an integral part of the body of the axle shaft.

Each of the shaft sections 5 at the sides of the differential casing 1—2 is provided with the spiral bead or annular screw rib, and the direction of the spiral is the same in each instance *i. e.* similar to a right hand screw thread, in order that the lubricant or lubricating oil which has a natural tendency to work toward the journal ends of the axle shaft from the differential casing, unless otherwise retarded, may be returned toward the casing 1—2. In this manner, while a sufficient quantity of oil passes to the right and left through the tubular casing toward the journal ends, to lubricate the axle shaft properly, an excess or waste of the oil is prevented by the action of the screw or spiral bead or rib which returns, continuously, the oil toward the differential casing as the axle sections revolve.

From the above description taken in connection with my drawings it is apparent that I have provided a device which adequately fulfils the purposes of the invention in an effective and workmanlike manner.

Having thus fully described my invention, what I claim and desire to secure by Letters Patent is—

The combination with an automobile rear axle tubular housing including the differential casing, of a sectional hollow shaft journaled in the tubular housing, and each section of the shaft fashioned with an integral spiral rib extending throughout its length and on the exterior thereof for returning lubricating material toward the differential casing.

In testimony whereof I affix my signature.

JOHN V. KAMMERS.